United States Patent [19]

Chao

[11] Patent Number: 4,866,712
[45] Date of Patent: Sep. 12, 1989

[54] METHODS AND APPARATUS FOR FAULT RECOVERY

[75] Inventor: Ming-Te Chao, Edison, N.J.

[73] Assignee: Bell Communications Research, Inc., Livingston, N.J.

[21] Appl. No.: 158,228

[22] Filed: Feb. 19, 1988

[51] Int. Cl.$^4$ ............................................. G06F 11/00
[52] U.S. Cl. ....................................... 371/5.1; 371/7; 371/5.5
[58] Field of Search ................... 371/5, 15, 16, 17, 18, 371/29, 12, 7; 364/200 MS File, 900 MS File

[56] References Cited

U.S. PATENT DOCUMENTS

| | | | |
|---|---|---|---|
| 3,704,363 | 11/1972 | Salmassy | 371/5 |
| 3,939,453 | 2/1976 | Schroeder | 371/17 X |
| 4,209,846 | 6/1980 | Seppa | 371/5 X |
| 4,635,214 | 1/1987 | Kasai | 371/5 X |
| 4,654,852 | 3/1987 | Bentley | 371/29 |
| 4,661,953 | 4/1987 | Venkatesh | 371/5 X |
| 4,730,313 | 3/1988 | Stephenson | 371/5 |
| 4,755,997 | 7/1988 | Takahashi | 371/5 X |

OTHER PUBLICATIONS

W. N. Anderson et al., "Error Controls", IBM TDB, vol. 16, No. 6 11/1973, pp. 1901-1902.

Primary Examiner—Jerry Smith
Assistant Examiner—Robert W. Beausoliel
Attorney, Agent, or Firm—James W. Falk

[57] ABSTRACT

An error recovery system for computers is shown in which an error table and an action table are used to control the parameters of the error recovery system. The error table has one entry for each possible error and contains a count increment for each corrective action that might be taken to correct that error. The action table includes an error count threshold for each possible corrective action. The system operates to accumulate error count increments against possible actions and, when the corresponding threshold is exceeded, initiates the corrective action. Since the table contents are easily modified, the recovery strategy can be updated and modified by the computer user without changing the recovery system programs.

8 Claims, 7 Drawing Sheets

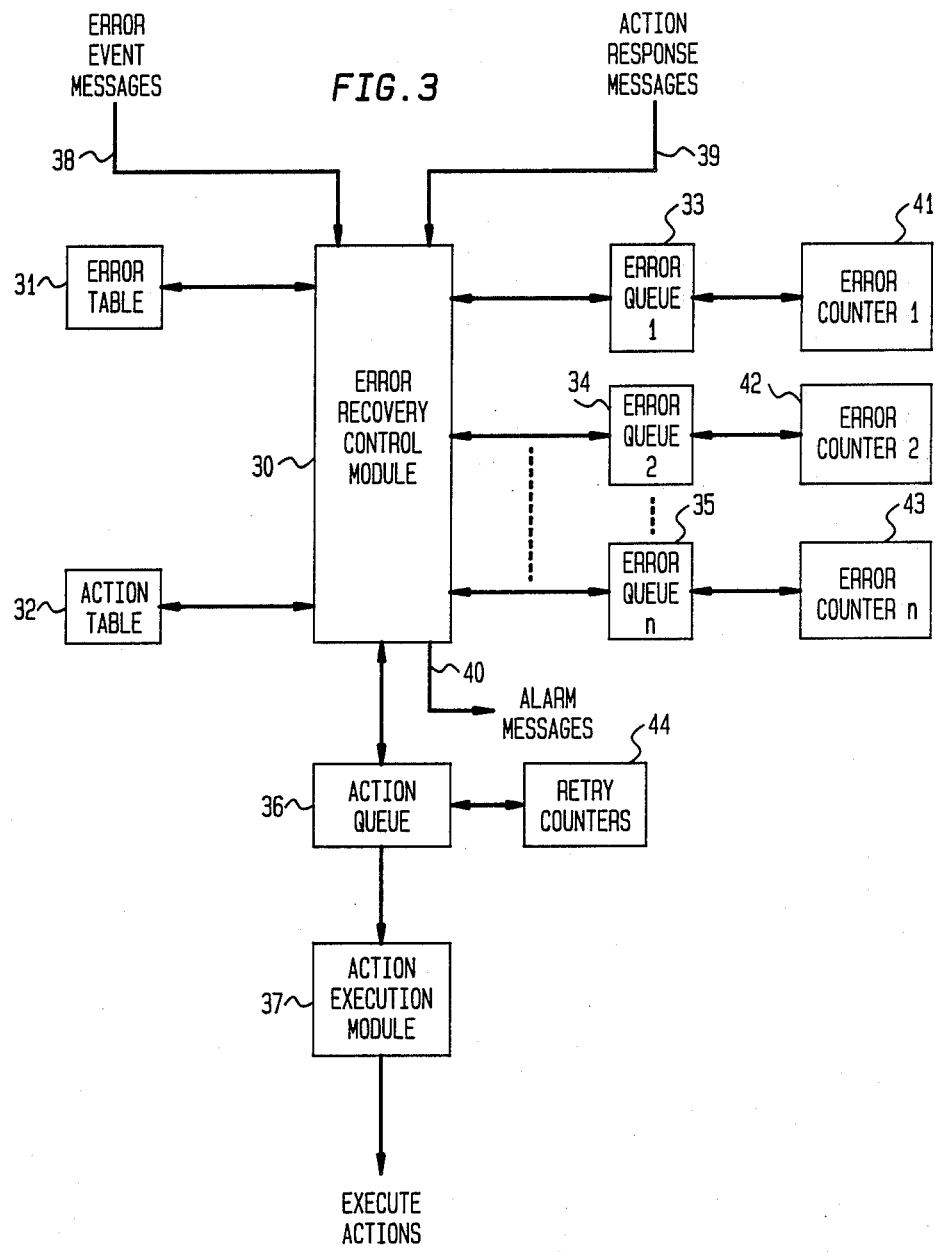

FIG. 4
ERROR TABLE

|  | ERROR (A) | ERROR (B) | ---- | ERROR (N) |
|---|---|---|---|---|
| ERROR CODE | V | V |  | V |
| ENTITY CLASS | V | V |  | V |
| ENTITY NAME | V | V |  | V |
| ALARM SEVERITY | V | V |  | V |
| ALARM MESSAGE | V | V |  | V |
| ACTION (A) – INCREMENT (A) | V | V |  | V |
| ACTION (B) – INCREMENT (B) | V | V |  | V |
| ACTION (C) – INCREMENT (C) | V | V |  | V |
| ACTION (N) – INCREMENT (N) | V | V |  | V |

(ACTION LIST: ACTION (A)–INCREMENT (A) through ACTION (N)–INCREMENT (N))

FIG. 5
ACTION TABLE

|  | ACTION (A) | ACTION (B) | ---- | ACTION (N) |
|---|---|---|---|---|
| ACTION CODE | V | V |  | V |
| ENTITY CLASS | V | V |  | V |
| ENTITY NAME | V | V |  | V |
| WATCH PERIOD | V | V |  | V |
| ERROR THRESHOLD | V | V |  | V |
| RETRY THRESHOLD | V | V |  | V |

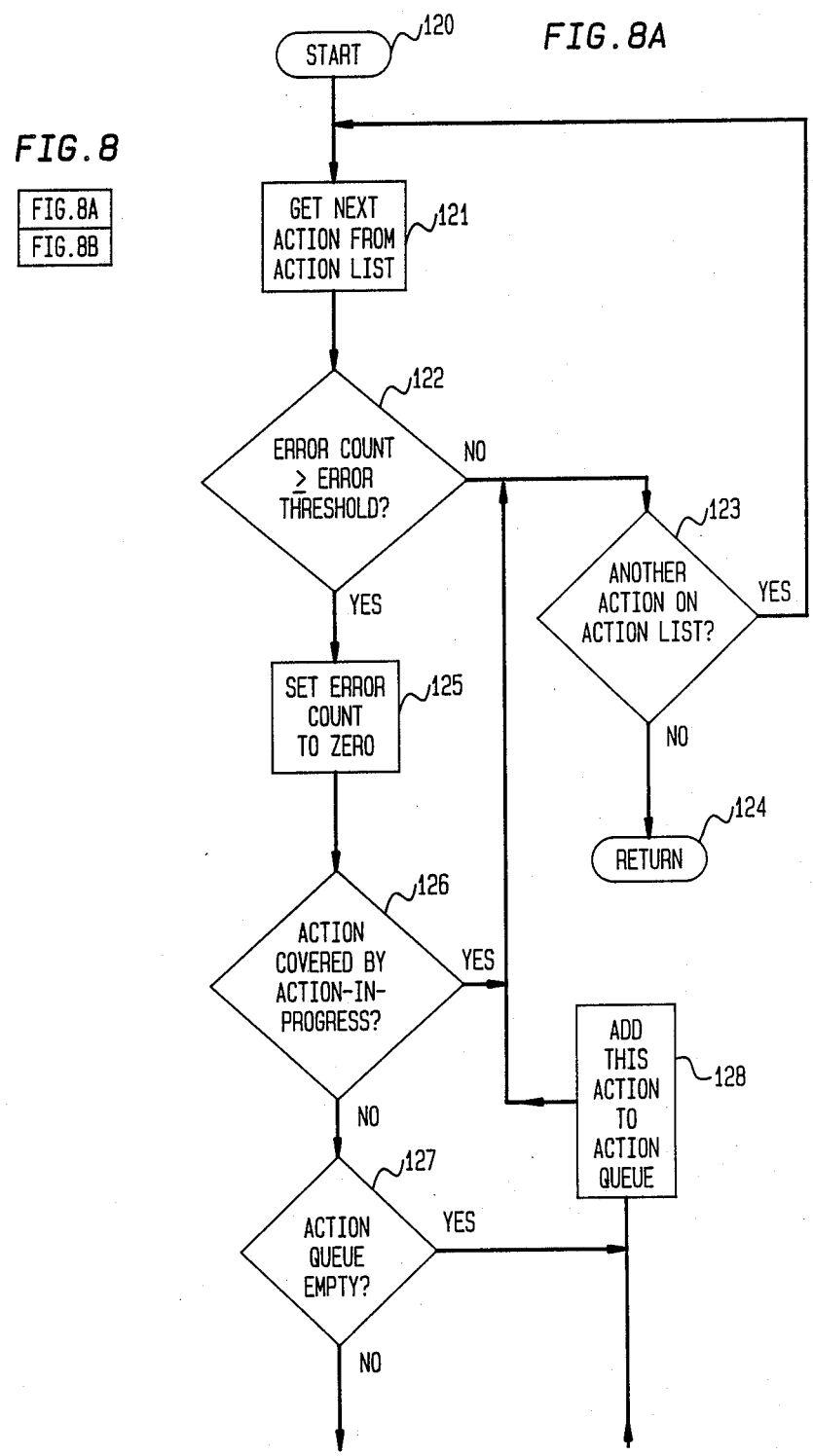

METHODS AND APPARATUS FOR FAULT RECOVERY

TECHNICAL FIELD

This invention relates to the recovery from a software error or a hardware fault in a complex data processing system and, more particularly, to the use of a table-driven recovery control arrangement to control the recovery of operational status in such a data processing system.

BACKGROUND OF THE INVENTION

Computer or data processing systems typically comprise a plurality of hardware components such as processors, memory devices, input-output devices and telecommunications devices. In addition, such computer systems also comprise a plurality of software components such as operating systems, application support systems, applications, processes, data structures, and so forth. A fault or an error in any one of these hardware or software components can invalidate the results of a computer system action. Much effort has therefore been invested in discovering and correcting such faults and errors.

When a fault or error is discovered in a computer system, a specific action, or series of actions, is taken in an attempt to restore the system to working order. These actions include restarting a software process, reinitializing a data area, rebooting a central processing unit, resetting a piece of hardware, and so forth. In a complicated system, it is often difficult to determine in real time which basic hardware or software component of the system is at fault and requires attention. Since the availability of the entire system is dependent on rapid reacquisition of full working status, an efficient strategy is required to minimize system recovery time.

One strategy often used to minimize recovery time for computer systems is to attempt recovery at the level of the simplest, most elementary component which could have caused the observed error or fault. If reinitialization of that lowest level component fails to clear the error or fault condition, a component at a next higher level (having a larger and more comprehensive function) is reinitialized. If the error is still not cleared, components at ever higher and higher levels are reinitialized until the fault or error condition is cleared. If, either after a predetermined timeout period, or after the highest level component possibly involved in the error or fault is reinitialized and the error condition remains, the automatic recovery system is deemed to have failed and an audio or visual alarm is used to alert attendant personnel to take corrective action. This type of multiphased, staged multilevel procedural strategy for recovering from errors and faults may be called a multistaged system recovery strategy.

The detailed logic necessary to implement multistaged system recovery strategies is complex, expensive and requires a significant development effort. Moreover, as new fault and error conditions are identified during the life cycle of the system, the additions and modifications to the logic of the recovery system become very difficult and expensive. Finally, the actual fault and error conditions, as well as the appropriate corrective actions, may change over the life cycle of the computing system. New faults and improved corrective action sequences may be discovered or may become necessary due to the aging of the components. For all of the above reasons, the design and maintenance of computer system recovery arrangements tend to be costly and unresponsive to new experience gained with the computer system.

SUMMARY OF THE INVENTION

In accordance with the illustrative embodiment of the present invention, these and other problem in the implementation of multistaged computer recovery systems are solved by providing a table-driven recovery control logic arrangement. Such a table-driven control arrangement centralizes the changeable control parameters and provides an easily modified control arrangement. More particularly, data tables in the computer are used to record the significant information about all identified error and fault conditions (the error table) and all the significant information about all of the possible corrective actions (the action table).

In accordance with one embodiment of the present invention, the error table includes a count increment for each action of a list of actions which might be taken in response to this error event. Each time an error event occurs, these counts can be accumulated toward the associated action and, when a count threshold is exceeded, the action is initiated. Each error event may contribute counts toward a plurality of actions, and hence the error table includes an action list with an error count increment for each action on the list. The action table, on the other hand, includes an error count threshold for that action and a watchperiod after which accumulated error counts are discarded as out of date. The action table may also include alarm messages to apprise attendant personnel of the status of the recovery system.

Using the error and action tables in accordance with the present invention, it is possible to weigh different error conditions differently in triggering any given corrective action. This gives great flexibility to the design and updating of the recovery system.

Recovery failures in the recovery system of the present invention are treated simply as another error condition which can be counted to trigger a different, higher level corrective action. Finally, the highest level corrective action for all fault and error conditions is simply the triggering of an audio or visual alarm to alert attendant personnel. This ultimate alerting action is likewise subject to the variably weighted counting against a threshold for different errors in exactly the same manner as the other automatic corrective actions.

The major advantage of the present invention is the ease with which new error conditions, new corrective actions, and even new recovery strategies can be accommodated. The entire corrective procedure can be implemented by general purpose software which operates independently of the actual errors or corrective actions in the system to implement the strategy embodied in the table entries. All of the variable data, however, is maintained in the editable error and action tables. The addition, deletion or modification of the error table or the action table entries are therefore all that is necessary to accommodate newly discovered errors, actions and strategies. Moreover, the error weights and the action thresholds can be varied over the life cycle of the system to accommodate new knowledge or age-dependent variations.

BRIEF DESCRIPTION OF THE DRAWING

A complete understanding of the present invention may be gained by considering the following detailed description in conjunction with the accompanying drawing, in which:

FIG. 3 shows a general block diagram of an error recovery system in accordance with the present invention;

FIG. 4 shows a graphical representation of an error event storage table for storage inside the computer system of FIG. 1 and which, in accordance with the present invention, can be used to dynamically control the error recording function required for the operation of the error recovery system of FIG. 3;

FIG. 5 shows a graphical representation of an action storage table for storage inside the computer system of FIG. 1 and which, in accordance with the present invention, can be used to dynamically control the error recovery actions required for the operation of the error recovery system of FIG. 3;

FIGS. 8A and 8B, when arranged as show in FIG. 8, show a graphical representation of an action queue update process useful in the flowchart of FIG. 6.

To facilitate reader understanding, identical reference numerals are used to designate elements common to the figures.

DETAILED DESCRIPTION

Figure 1:
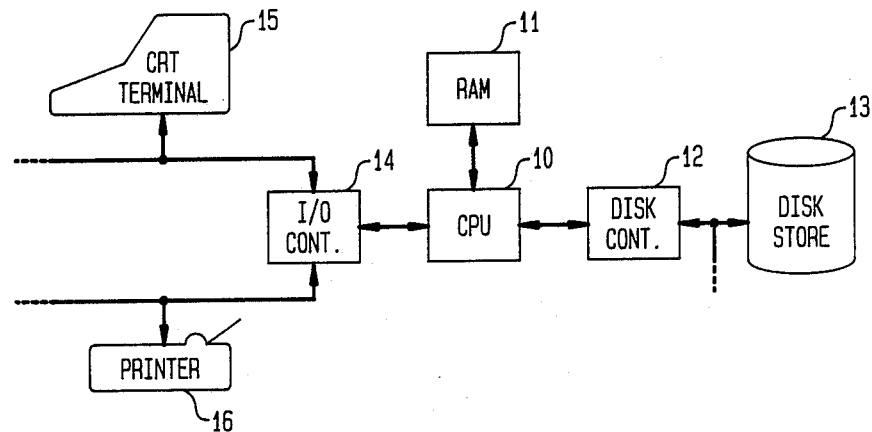
FIG. 1 shows a general block diagram of a computer hardware system in which the present invention might find use.

Referring more particularly to FIG. 1 of the drawings, there is shown a general block diagram of a computer hardware system comprising a Central Processing Unit (CPU) 10 and a Random Access Memory (RAM) unit 11. Computer programs stored in the RAM 11 are accessed by CPU 10 and executed, one instruction at a time, by CPU 10. Data, stored in other portions of RAM 11, are operated upon by the program instructions accessed by CPU 10 from RAM 11, all in accordance with well-known data processing techniques.

Central Processing Unit (CPU) 10 also controls and accesses a disk controller unit 12 which, in turn, accesses digital data stored on one or more disk storage units such as disk storage unit 13. In normal operation, programs and data are stored on disk storage unit 13 until required by CPU 10. At this time, such programs and data are retrieved from disk storage unit 13 in blocks and stored in RAM 11 for rapid access.

Central Processing Unit (CPU) 10 also controls an Input-Output (IO) controller 14 which, in turn, provides access to a plurality of input devices such as CRT (cathode ray tube) terminal 15, as well as a plurality of output devices such as printer 16. Terminal 15 provides a mechanism for a computer operator to introduce instructions and commands into the computer system of FIG. 1, and may be supplemented with other input devices such as card and tape readers, remotely located terminals, optical readers and other types of input devices. Similarly, printer 16 provides a mechanism for displaying the results of the operation of the computer system of FIG. 1 for the computer user. Printer 16 may similarly be supplemented by line printers, cathode ray tube displays, phototypesetters, graphical plotters and other types of output devices.

The constituents of the computer system of FIG. 1 and their cooperative operation are well-known in the art and are typical of all computer systems, from small personal computers to large main frame systems. The architecture and operation of such systems are well-known and, since they form no part of the present invention, will not be further described here.

Figure 2:
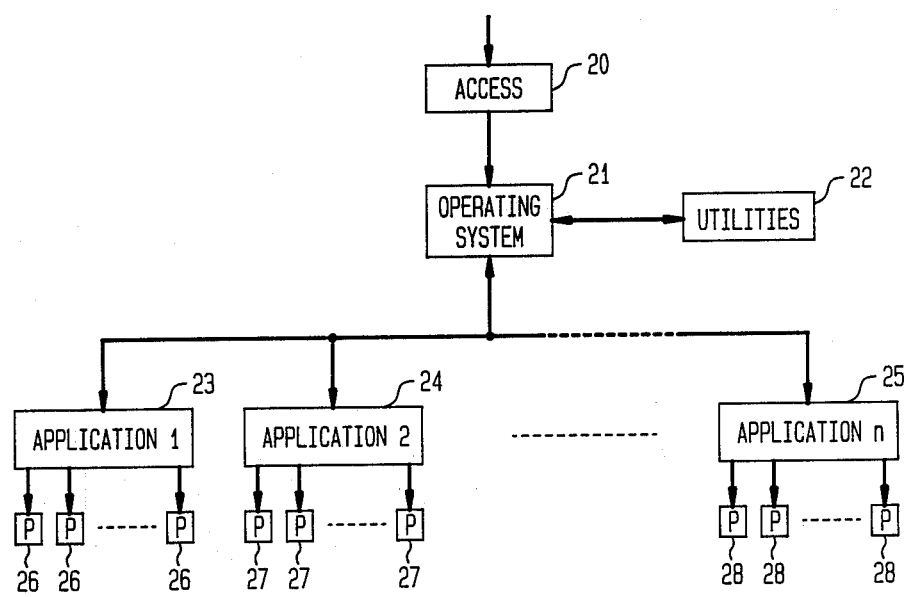
FIG. 2 shows a general block diagram of a computer software system which might be resident on the computer hardware system of FIG. 1 and in which the present invention might find use.

In FIG. 2 there is shown a graphical representation of a typical software architecture for a computer system such as that shown in FIG. 1. The software of FIG. 2 comprises an access mechanism 20 which, for simple personal computers, may comprise no more than turning the system on. In larger systems, providing service to a larger number of users, login and password procedures would typically be implemented in access mechanism 20. Once access mechanism 20 has completed the login procedure, the user is placed in the operating system environment 21. Operating system 21 coordinates the activities of all of the hardware components of the computer system (shown in FIG. 1) and provides a number of utility programs 22 of general use to the computer user. Utilities 22 might, for example, comprise assemblers and compilers, mathematical routines, basic file handling routines and system maintenance facilities.

The computer software system of FIG. 2 typically also includes a plurality of application programs such as application programs 23, 24, . . . 25. Application programs 23–25 might, for example, comprise an editor, a spreadsheet program, a graphics package, a data base manager, and so forth. Each of the application programs 23 through 25 includes or provides access to a plurality of programmed processes 26, 27, . . . 28, respectively. It is the programmed processes 26 through 28 which actually perform the tasks necessary to carry out the purpose of the corresponding application program. In order to make effective use of these application packages, the user must be able to execute the processes 26–28 at the time, and in the sequence, necessary to accomplish the user's goals.

It is the recovery from errors and failures in either the hardware components of FIG. 1 or the software components of FIG. 2 toward which the present invention is directed.

In FIG. 3 there is shown a general block diagram of an error recovery system in accordance with the present invention. The error recovery system of FIG. 3 comprises an error recovery control module 30 which performs all of the control functions necessary to operate the recovery system. Error event messages from the various parts of the systems of FIGS. 1 and 2 are delivered to module 30 on line 38. The nature and significance of these error events are not the subject matter of this invention, but include such well-known events as access timeouts, acknowledgement failures, hardware failures, and so forth. Each error event message received on line 38 includes an error event code, the type or class of entity in which the failure occurred, the identity of the specific entity where the failure occurred and the clock time at which the error event occurred. These error event messages are formulated in the hardware or software module where the error occurs in accordance with well-known techniques and will not be further described here.

Recovery module 30 responds to error event messages by consulting the error event entry in error table 31 corresponding to the error event to determine which actions should be responsive to this event. For each such action, an entry is added to, or updated in, one of error queues 33-35. An error queue is provided for each of the possible corrective actions identified on action table 32. Each of error queues 33-35 is accompanied by an error event counter 41-43, respectively. The error queue entries record the error events generating counts towards the enablement of each of the actions, and thus each error queue can have a number of entries equal to the number of errors contributing to the execution of that particular action. Specifically, each error queue entry in each of error queues 33-35 includes (1) an error event code, (2) an error event count increment, and (3) the occurrence time for the error event. These entries will be used as described below to control the error recovery system. The error event counters 41-43 are used to accumulate the error counts for the action corresponding to the error queue to which each respective counter is connected.

When the accumulated error count in one of error counters 41-43 equals or exceeds the threshold count for that action in action table 32, that action is placed in action queue 36. Each entry in action queue 36 represents an action to be taken which has been triggered by the accumulated error count exceeding an error count threshold. The initiation of such actions in queue 36 must await the completion, as indicated by an action response message, of a previously initiated action. Moreover, failed recovery actions can be retried as many times as desired before escalating to a higher level action. Such retries are controlled by a retry count in one of the retry counters 44 connected to action queue 36. Specifically, each entry in action queue 36 includes (1) the action code, (2) the number of retry attempts to be made for the identified action, and (3) an action-in-progress mark which is created when the action is initiated and removed when the action is completed.

In due course, each action in action queue 36 is forwarded to the action execution module 37 where it is executed to accomplish the restorative action. After this action has been completed, an action response message is received at the recovery system of FIG. 3 on line 39. The action response message may indicate that the corrective action was successful and that the error condition has been corrected. In that event, the action can be removed from the action queue 37. On the other hand, the action response message may indicate that the corrective action failed and the error is persisting. In that event, the failure message is treated as just another error event message which causes error counts to be accumulated, in one of counters 44, toward an action retry, causes the initiation of a higher level action, or causes an alarm to attendant personnel. The retry count is maintained in one of the retry counters 44, one of which is provided for each possible action. The alarms and alarm messages are provided by module 30 on line 40.

Figure 6:
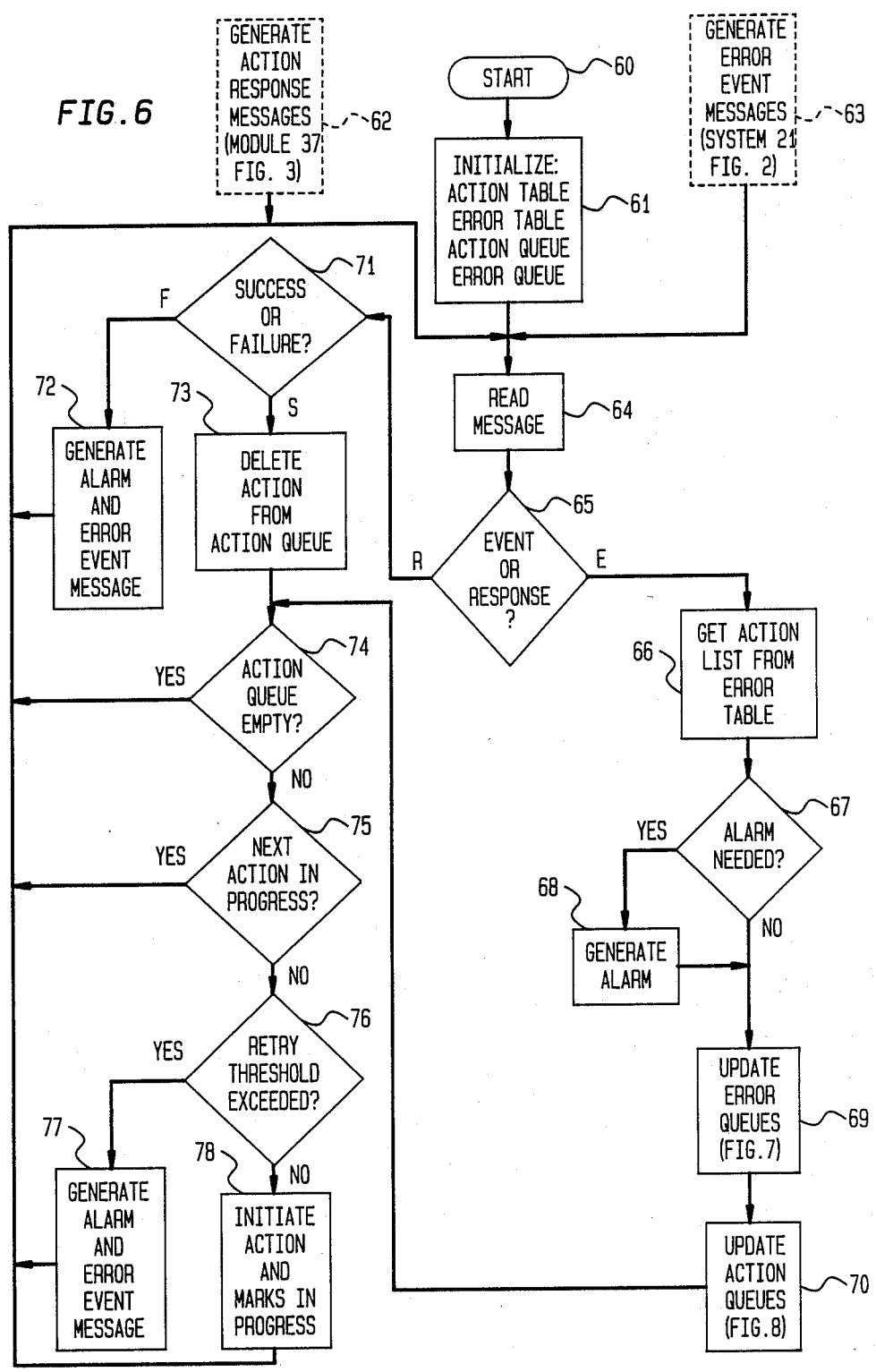
FIG. 6 shows a graphical representation of a flow-chart for the operation of the error recovery system of FIG. 3.

The operation of the error recovery system of FIG. 3 will be better understood upon consideration of the flowchart of FIG. 6 which represents the detailed operation of the recovery system of FIG. 3.

Referring first to FIG. 4, there is shown a graphical representation of the contents of the error event table 31 of FIG. 3. As can be seen in FIG. 4, the error table includes a plurality of fields with values for all of the fields for each defined error event in the system. As shown in the first column, the fields of the error table are (1) the error event code uniquely identifying the error, (2) the class of entity in which the error can occur, (3) the identification of each of the particular entities in which the error can occur, (4) an indication of the severity of the alarm which should be generated in response to this particular error, (5) the text of the alarm message, if any, which should be delivered to the attendant personnel in the event that this error occurs, and (5) an action list including all of the corrective actions which might be taken in response to this error in order to correct the error. Associated with each corrective action on the action list is an error count increment which is used to increment one of error counters 41-43. When the error counter in the appropriate error counter reaches a threshold established for this particular action, the action is initiated.

The action list suggests that more than one action can be initiated to correct the same error. Indeed, the multilevel, multiphased recovery strategy presumes this to be true. Such a strategy may be readily implemented by selecting the count increments and the count thresholds for each action to cause the desired progression in corrective actions.

The error table includes a value for each of these fields for each of the identified error events. These fields can be added or modified with simple editing facilities thereby to change the recovery strategy without further modifications to the recovery system, either in hardware or software.

In FIG. 5 there is shown a graphical representation of the action table 32 of FIG. 3. The action table of FIG. 5 also includes a plurality of fields, one for each possible corrective action. For each such action, the action table of FIG. 5 includes the following fields: (1) an action code uniquely identifying the correactive action (2) an identification of the class of entity which is to take the corrective action so identified, (3) an identification of each of the particular entities which is to actually take this action, (4) a watchperiod, i.e., a period of time after which unrepeated errors are presumed to be transitory and the error count for that error can be reset to zero, (5) the error threshold for this action, i.e., the minimum error count which will trigger this action, and (6) the retry threshold, i.e., the number of times this action can be retried within the watchperiod for this action.

The error table of FIG. 4 and the action table of FIG. 5 are shown separately only because they constitute logically distinct value relationships. These tables may, of course, be stored together physically and accessed with the same access mechanism. Such storage techniques are well-known in the art and will not be further described here.

In FIG. 6 there is shown a detailed flowchart of the operation of the recovery system of FIG. 3. In FIG. 6, the flowchart begins at starting box 60 from which box 61 is entered. Box 61 initializes all of the queues 33-36 (FIG. 3) and initializes the error table (FIG. 4) and the action table (FIG. 5). Error event messages originate in box 63 following error events (operating system 21 in FIG. 2) while action response messages originate in box 62 following the execution of corrective actions (execution module 37 in FIG. 3). These messages are read in box 64.

If the message read in box 64 is an error event message, decision box 65 detects that fact and box 66 is entered. In box 66, the action list for this particular error event is retrieved from the error table (FIG. 4). In decision box 67, it is determined if the error calls for an alarm and, if so, the alarm is generated in box 68. Thereafter, in box 69, the error counters 41–43 and the error queues 33–35 (FIG. 3) are updated, using the error count increments from the action list retrieved from the error table. In box 70, the action counts in action counters 44 and the contents of action queue 36 (FIG. 3) is updated, adding all actions for which the count threshold is exceeded. The detailed operation of boxes 69 and 70 will be discussed in connection with FIGS. 7 and 8, respectively.

Following the updating of the error queues and the action queue, decision box 74 is entered. If the action queue is empty, box 64 is re-entered to read the next message. If the action queue is not empty, decision box 75 is entered to see if the next action in the action queue is already in progress. If the next action is already in progress, box 64 is re-entered to read the next message. If the next action is not in progress, decision box 76 is entered to determine if the action retry threshold for the next action is exceeded, as determined by the count in one of counters 44. If the retry threshold is exceeded, box 77 is entered to generate an appropriate alarm and to launch an error event message detailing this excessive number of retries as a new error event. The error event message thus launched is read in box 64 just like any other error event message.

If the retry threshold is not exceeded, as determined by decision box 76, box 78 is entered to initiate the next action in the action queue and mark that action as being in progress. Thereafter, the process waits for the next message to arrive at box 64. It is to be remembered that, following the completion of the corrective action, an action response message is generated in box 62 to insure proper handling of the successful or unsuccessful action.

Returning to decision box 65, if the message is determined to be an action response message rather than an error event message, decision box 71 is entered to determine from the response message whether the action was a success (and corrected the error) or was a failure. If the action failed, box 72 is entered to generate an alarm, if appropriate, and an error event message identifying this failure as a new class of error. If the action was successful, the action is deleted from the action queue in box 73 and decision box 74 reentered to initiate the next action in the action queue, if any. It will be noted that only one action can be taken at a time. Once the action is in progress, all other actions must wait for completion of the action in progress and the receipt of the appropriate action response message. This one-at-a-time procedure insures that multiple corrective actions do not themselves cause errors by interfering with one another.

Figure 7:
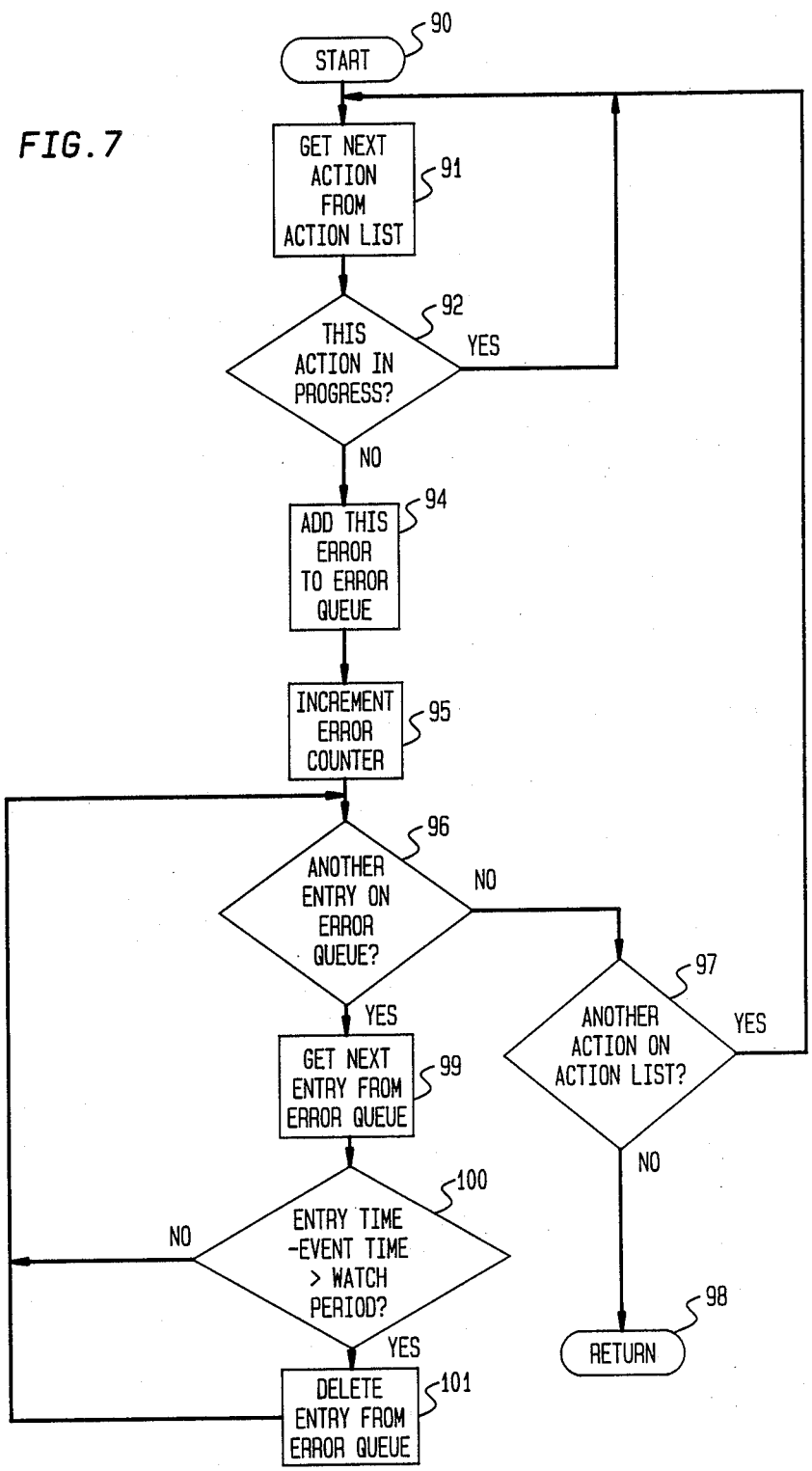
FIG. 7 shows a graphical representation of an error queue update process useful in the flowchart of FIG. 6.

In FIG. 7 there is shown a detailed flowchart of the error queue update procedure of box 69 in FIG. 6. In FIG. 7, the procedure begins at starting box 90 and proceeds to box 91 where the next action on the action list from the error table is obtained. In decision box 92 it is determined whether this action is already in progress. If so, box 91 is re-entered to get the next action on the action list. If the action is not in progress, box 94 is entered to add this error event to the appropriate error queue. Each entry in each of the error queues includes the error event code, the incremental count for this error event towards the action threshold for this action, and the error event time of occurrence of this error event. Error event counters 41–43 of FIG. 3 contain the accumulated error event counts for all of the entries of the associated one of error queues 33–35, respectively.

In box 95, the accumulated error count in the associated error counter 41–43 is incremented by the amount of the error count increment in the action list for this action. Thereafter, decision box 96 is entered to determine if there is another entry on the error queue. If not, decision box 97 is entered to determine if there is another action on the action list. If so, box 91 is re-entered to deal with the new action. If not, the error queue update is complete and terminal box 98 is entered to return to the flowchart of FIG. 6. decision box 100, the watchperiod in the action table for this action is compared to the difference between the error event time for this error event and the error event time for the most recent occurrence of the same error event, stored in the error queue entry. If the period since the last error is less than the watchperiod, decision box 96 is re-entered to check for the next entry on the error queue. If this period is greater than the watchperiod, box 101 is entered and the entry is deleted from the error queue. That is, if the second error does not occur within one watchperiod of the first error, the error is presumed to be transitory and its record is erased from the system in box 101.

It can be seen that the flowchart of FIG. 7 operates to update all of the error queues corresponding to all of the actions in the action list for the error event that has occurred. Together, the error queues therefore serve to maintain a history of the error events, thereby permitting actions to be taken based on the number and sequence of the errors that actually occur.

Figure 8B:
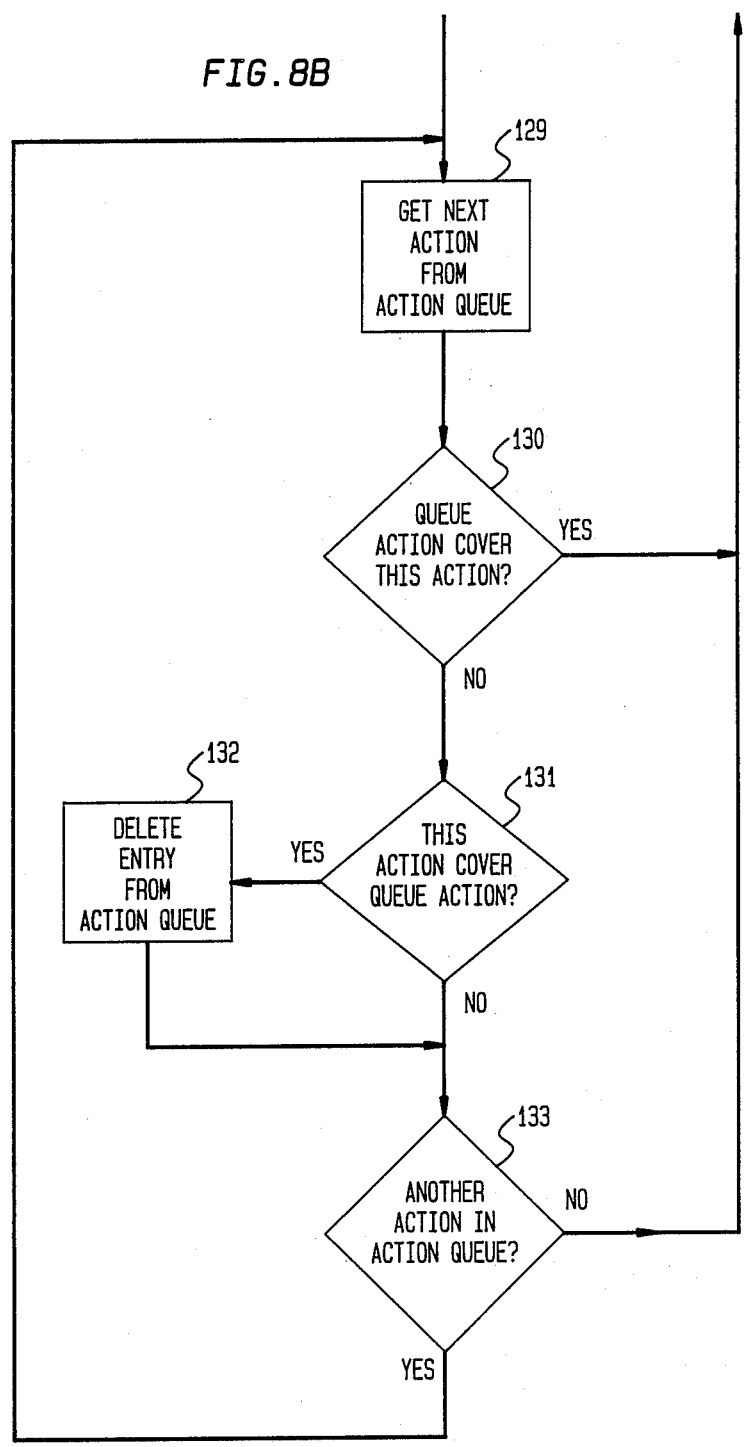

In FIG. 8 there is shown a detailed flowchart of the action queue update procedure shown generally in box 70 of FIG. 6. Starting in start box 120 in FIG. 8, the action queue update procedure starts in box 121 by getting the next action from the action list in the error table for this error event. In decision box 122, the error count cumulation in the error queue for this error and for this action is compared to the error threshold stored in the action table for this action. If the accumulated count is less than the threshold, box 123 is entered to determine if there are any more actions on the action list. If so, box 121 is re-entered to get the next action on the action list. If there are no more actions on the action list, terminal box 124 is entered to return to the procedure of FIG. 6.

If the error count does exceed the error threshold in box 122, box 125 is entered where this error count is reset to zero. Since an action will now be initiated, it is no longer necessary to maintain the accumulated error count needed to trigger the action. In decision box 126, it is determined whether this action is "covered" by an action-in-progress. It will be recalled that one of the fields in the action queue entries is an action-in-progress mark which indicates that the associated action has been initiated, but has not yet returned a response message indicating that the action is completed. The term "covered," in this context, means "included within" the action. That is, if an action necessarily involves the execution of a lower level action (e.g., restarting an application program necessarily involves restarting all of the processes in that application), then the covered action need not be taken. In that event, box 123 is entered to get the next action on the list, or to terminate the update procedure.

If the current action is not covered by the action-in-progress, decision box 127 is entered to determine if the action queue is empty. If the action queue is empty, the current action is added to the action queue in box 128 and decision box 123 re-entered. If there is another action in the action queue, box 129 is entered to get the next action from the action queue. In box 130, it is determined if the action retrieved from the action queue covers this action. If so, no new entry for this action need be made in the action queue and box 123 is re-entered. If this action covers the action retrieved from the action queue, as determined by box 131, then the retrieved action entry is deleted from the action queue in box 132. That is, if the new action covers the queued action, then there is no need to keep the queued action, and it can be deleted. In box 133 it is determined if there is another action in the action queue. If so, box 129 is re-entered to process this action from the action queue. If not, box 128 is entered to add this action to the action list and then box 123 is re-entered to process the next action on the action list, or to terminate if there are no more actions on the action list.

It can be seen that the procedure of FIG. 8 operates to keep the action queue 36 of FIG. 3 up to date in response to new error event messages. As previously noted in connection with FIG. 6, the action queue is used to initiate new corrective actions once the previous action has terminated.

It should also be clear to those skilled in the art that further embodiments of the present invention may be made by those skilled in the art without departing from the teachings of the present invention.

What is claimed is:

1. A computer error recovery system comprising
    an error table for storing each identified error in said computer, an action list of all actions to be taken to correct the identified error, and an error count increment value for each said action on said action list,
    an action table for storing, for each possible corrective action to be taken, an error count threshold value which, when exceeded, triggers the action corresponding to said error count threshold,
    means, responsive to an identified error, for accumulation error count increments, and
    means, utilizing said error and said action table and response to accumulated error count increments, for automatically initiating each corrective action for which said accumulated count exceeds the count threshold.

2. The computer error recovery system according to claim 1 further comprising means for editing said error and action tables to add, delete or modify the contents of said tables.

3. The computer error recovery system according to claim 1 wherein
    at least one of said possible errors comprises the failure to recover from another one of said possible errors after executing the corrective action.

4. A method for recovering from errors occurring in a computer system, said method comprising the steps of
    storing an easily editable error table in said computer, said error table including, for each identified error in said computer, an action list of all actions to be taken to correct the identified error, and an error count increment for that action,
    storing an easily editable action table in said computer, said action table including, for each possible corrective action to be taken, an error count threshold which, when exceeded, triggers an action corresponding to said error count threshold,
    accumulating the error counts for each identified error against all actions on said action list for said each identified error and
    automatically initiating a particular corrective action when the accumulated count for that particular action exceeds the count threshold for said particular action.

5. The method according to claim 4 further comprising the steps of
    editing said error and action tables to add, delete or modify the contents of said tables in response to newly discovered errors, newly discovered corrective actions, or new recovery strategies.

6. The method according to claim 4 further including the step of
    reporting the failure of a corrective action as another one of said identified errors.

7. A table-driven error recovery subsystem for data processing system comprising
    a user-editable error table including each possible error that might occur in said system,
    a user-editable action table including each possible corrective action that might be useful in said system, and
    means automatically responsive to the contents of said tables for carrying out a multistaged recovery strategy for said data processing system.

8. The error recovery subsystem according to claim 7 further including
    a plurality of queues for storing a history of the errors that have occurred in said system, and means for implementing said strategy in response to said history.

* * * * *

UNITED STATES PATENT AND TRADEMARK OFFICE
CERTIFICATE OF CORRECTION

PATENT NO. : 4,866,712

DATED : September 12, 1989

INVENTOR(S) : Ming-Te Chao

It is certified that error appears in the above-identified patent and that said Letters Patent is hereby corrected as shown below:

Column 6, line 40, "correactive" should read --corrective--.
        Column 8, line 16, after "FIG. 6." start a new paragraph and add --If decision box 96 indicated that there is another entry on the error queue for this action, box 99 is entered to get the next entry from the error queue. In--.
Column 9, line 52, "response" should read --responsive--.

Signed and Sealed this

Tenth Day of May, 1994

*Attest:*

BRUCE LEHMAN

*Attesting Officer*      *Commissioner of Patents and Trademarks*